United States Patent
Devlin et al.

(10) Patent No.: US 12,245,722 B2
(45) Date of Patent: Mar. 11, 2025

(54) SCALE DETECTION SYSTEMS AND METHODS FOR AIRCRAFT BEVERAGE MAKERS

(71) Applicant: B/E AEROSPACE, INC., Winston Salem, NC (US)

(72) Inventors: Byron Devlin, Kansas City, MO (US); Derek J. Taylor, Olathe, KS (US); Jeb Stewart, Honolulu, HI (US)

(73) Assignee: B/E AEROSPACE, INC., Winston Salem, NC (US)

( * ) Notice: Subject to any disclaimer, the term of this patent is extended or adjusted under 35 U.S.C. 154(b) by 819 days.

(21) Appl. No.: 17/409,581

(22) Filed: Aug. 23, 2021

(65) Prior Publication Data

US 2023/0053386 A1 Feb. 23, 2023

(51) Int. Cl.
| | |
|---|---|
| A47J 31/56 | (2006.01) |
| A47J 31/52 | (2006.01) |
| A47J 31/58 | (2006.01) |
| A47J 31/54 | (2006.01) |
| G05D 23/24 | (2006.01) |

(52) U.S. Cl.
CPC ........... *A47J 31/58* (2013.01); *A47J 31/5253* (2018.08); *A47J 31/56* (2013.01); *A47J 31/542* (2013.01); *G05D 23/24* (2013.01)

(58) Field of Classification Search
CPC ...... A47J 31/60; A47J 31/542; A47J 31/5253; A47L 15/4285; G01N 25/72; G01N 25/08; G05D 23/24; G05D 23/1904
USPC ................................................... 99/281, 285
See application file for complete search history.

(56) References Cited

U.S. PATENT DOCUMENTS

| | | | |
|---|---|---|---|
| 4,122,763 A | | 10/1978 | Waninger et al. |
| 4,214,148 A | * | 7/1980 | Fleischhauer ......... A47J 31/545 |
| | | | 392/467 |
| 4,292,499 A | | 9/1981 | Kleinschmidt et al. |
| 4,762,055 A | * | 8/1988 | Shimomura ......... A47J 31/0573 |
| | | | 392/467 |
| 4,827,837 A | | 5/1989 | Johnson et al. |
| 5,183,998 A | | 2/1993 | Hoffman et al. |
| 10,151,475 B2 | | 12/2018 | Chattopadhyay et al. |

(Continued)

FOREIGN PATENT DOCUMENTS

| | | |
|---|---|---|
| DE | 102019217640 | 5/2021 |
| EP | 1178748 | 10/2006 |
| WO | 2021094931 | 5/2021 |

OTHER PUBLICATIONS

European Patent Office, European Search Report dated Jan. 19, 2023 in Application No. 22191421.1.

*Primary Examiner* — Reginald Alexander
(74) *Attorney, Agent, or Firm* — SNELL & WILMER L.L.P.

(57) ABSTRACT

A beverage maker may comprise a heating system, a temperature sensor operably coupled the heating system, and a controller. The controller may be configured to receive a series of measured temperature signals from the temperature sensor, calculate a change in temperature using the series of measured temperature signals, and calculate an efficiency of the heating system based on the change in temperature. The controller may further estimate a scale buildup based on the efficiency of the heating system, and store at least one of the estimated scale buildup or the efficiency of the heating system in a heating system performance database.

19 Claims, 5 Drawing Sheets

(56) References Cited

U.S. PATENT DOCUMENTS

| | | | |
|---|---|---|---|
| 11,366,075 B2* | 6/2022 | Törnquist | A47L 15/4285 |
| 11,768,572 B2* | 9/2023 | Ripperda | A47J 31/521 |
| | | | 99/285 |
| 2008/0317091 A1* | 12/2008 | Siddons | A47J 27/21091 |
| | | | 374/102 |
| 2021/0000286 A1* | 1/2021 | Devlin | A47J 31/002 |
| 2021/0030197 A1 | 2/2021 | Vetterli et al. | |
| 2021/0247295 A1 | 8/2021 | Abu-Saymeh et al. | |

* cited by examiner

SCALE DETECTION SYSTEMS AND METHODS FOR AIRCRAFT BEVERAGE MAKERS

FIELD

The present disclosure relates to scale detection in fluid heating systems, in particular, systems and methods of scale detection and monitoring for use with aircraft beverage makers.

BACKGROUND

A potable water supply for an aircraft is generally filled while the aircraft is on the ground. This can mean the potable water may be sourced from several different geographic locations. Different geographic locations provide water of varying levels of hardness, meaning different concentrations of hard minerals dissolved in the water. Hard water (i.e., water with high concentrations of hard minerals) can create scale buildup in the aircraft beverage making devices, particularly, in devices that heat the water and/or create steam. Scale buildup tends to be especially harmful in devices that employ inline heaters, as the scale buildup may restrict the flow of the water through the fluid lines/conduits. Hard water can also lead to scale buildup on the liquid control solenoids downstream of the device heaters.

SUMMARY

Disclosed herein is a beverage maker. In accordance with various embodiments, the beverage maker may comprise a heating system, a temperature sensor operably coupled to the heating system, a controller configured to receive a measured temperature signal from the temperature sensor, and a tangible, non-transitory computer-readable storage medium. The tangible, non-transitory computer-readable storage medium has instructions stored thereon for that, in response to execution by the controller, cause the controller to perform operations, which may comprise receiving, by the controller, a series of measured temperature signals from the temperature sensor; calculating, by the controller, a change in temperature using the series of measured temperature signals; calculating, by the controller, an efficiency of the heating system based on the change in temperature; estimating, by the controller, a scale buildup based on the efficiency of the heating system; and storing, by the controller, at least one of the estimated scale buildup or the efficiency of the heating system in a heating system performance database.

In various embodiments, calculating, by the controller, the efficiency of the heating system based on the change in temperature comprises determining, by the controller, an expected change in temperature using a system thermal model; and comparing, by the controller, the change in temperature to the expected change in temperature.

In various embodiments, calculating, by the controller, the efficiency of the heating system based on the change in temperature further comprises accessing, by the controller, previous heating system performance data stored in the heating system performance database; and comparing, by the controller, the change in temperature to the previous heating system performance data stored.

In various embodiments, a display device is operably coupled to the controller, and the operations further comprise commanding, by the controller, the display device to display the estimated scale buildup.

In various embodiments, a display device is operably coupled to the controller, and the operations further comprise determining, by the controller, an estimated service life of the heating system; and commanding, by the controller, the display device to display the estimated service life.

In various embodiments, a display device is operably coupled to the controller, and the operations further comprise: determining, by the controller, if the estimated scale buildup is impacting a performance of the beverage maker; and commanding, by the controller, the display device to display a maintenance required alert, if the estimated scale buildup is impacting the performance of the beverage maker.

In various embodiments, determining, by the controller, if the estimated scale buildup is impacting the performance of the beverage maker comprises comparing, by the controller, the efficiency of the heating system to a threshold efficiency.

In various embodiments, a flow rate sensor is operably coupled to the heating system. The flow rate sensor is configured to measure a rate of flow of fluid through the heating system. The controller may be configured to receive a flow rate measurement signal from the flow rate sensor and calculate the efficiency of the heating system using the flow rate measurement signal.

In various embodiments, the controller is configured to receive energy input data. The controller may calculate the efficiency of the heating system using the energy input data.

An article of manufacture is also disclosed herein. In accordance with various embodiments, the article includes a tangible, non-transitory computer-readable storage medium having instructions stored thereon for detecting and monitoring scale buildup in a beverage maker. The instructions, in response to execution by a controller, cause the controller to perform operations, which may comprise receiving, by the controller, a series of measured temperature signals from a temperature sensor operably coupled to a heating system of the beverage maker; determining, by the controller, a change in temperature using the series of measured temperature signals; calculating, by the controller, an efficiency of the heating system based on the change in temperature; estimating, by the controller, a scale buildup based on the efficiency of the heating system; and storing, by the controller, at least one of the estimated scale buildup or the efficiency of the heating system in a heating system performance database.

In various embodiments, calculating, by the controller, the efficiency of the heating system based on the change in temperature further comprises: accessing, by the controller, previous heating system performance data stored in the heating system performance database; and comparing, by the controller, the change in temperature to the previous heating system performance data stored.

In various embodiments, calculating, by the controller, the efficiency of the heating system based on the change in temperature comprises: determining, by the controller, an expected change in temperature using a system thermal model; and comparing, by the controller, the change in temperature to the expected change in temperature.

In various embodiments, the operations further comprise commanding, by the controller, a display device to display the estimated scale buildup. In various embodiments, the operations further comprise determining, by the controller, an estimated service life of the heating system; and commanding, by the controller, a display device to display the estimated service life.

In various embodiments, the operations further comprise commanding, by the controller, the display device to display a maintenance required alert if the efficiency of the heating system is less than a threshold efficiency. In various embodiments, the operations further comprise determining, by the controller, a descaling operation has been performed; and deleting, by the controller, the previous heating system performance data from the heating system performance database.

A method for detecting and monitoring scale buildup in a beverage maker is also disclosed herein. In accordance with various embodiments, the method may comprise the step of receiving, by a controller, a series of measured temperature signals from a temperature sensor operably coupled to a heating system of the beverage maker; determining, by the controller, a change in temperature using the series of measured temperature signals; calculating, by the controller, an efficiency of the heating system based on the change in temperature; estimating, by the controller, a scale buildup based on the efficiency of the heating system; and storing, by the controller, at least one of the estimated scale buildup or the efficiency of the heating system in a heating system performance database.

In various embodiments, calculating, by the controller, the efficiency of the heating system based on the change in temperature further comprises accessing, by the controller, previous heating system performance data stored in the heating system performance database; determining, by the controller, an expected change in temperature using a system thermal model; and comparing, by the controller, the change in temperature to the expected change in temperature.

In various embodiments, the method may further comprise determining, by the controller, a descaling operation has been performed; and deleting, by the controller, the previous heating system performance data from the heating system performance database.

In various embodiments, the method may further comprise receiving, by the controller, a flow rate measurement signal from a flow rate sensor configured to measure a flow rate of a heat exchanger fluid through the heating system; receiving, by the controller, energy input data; and determining, by the controller, the change in temperature using the series of measured temperature signals, the flow rate measurement signal, and the energy input data.

A scale detection and monitoring system is also disclosed herein. In accordance with various embodiments, the scale detection and monitoring system may comprise a heating system, a temperature sensor operably coupled to the heating system, and a controller in communication with the temperature sensor. The controller is configured to receive a series of measured temperature signals from the temperature sensor and determine a change in temperature using the series of measured temperature signals received from the temperature sensor. The controller is configured to calculate an efficiency of the heating system based on the change in temperature and to estimate a scale buildup based on the efficiency of the heating system.

In various embodiments, the heating system may comprise an inline heat exchanger. The inline heat exchanger may include a heating element, a thermally conductive heating block located about the heating element, and a conduit thermally coupled to the heating element via the thermally conductive heating block. The first temperature sensor may be configured to measure a temperature of the heating block.

In various embodiments, a flow rate sensor may be configured to measure a rate of fluid flow through the heating system. The controller may be configured to receive a measured flow rate signal from the flow rate sensor. In various embodiments, controller is configured to calculate the efficiency of the heating system based on the change in temperature and the measured flow rate signal.

The foregoing features and elements may be combined in various combinations without exclusivity, unless expressly indicated herein otherwise. These features and elements as well as the operation of the disclosed embodiments will become more apparent in light of the following description and accompanying drawings.

Figure 1:
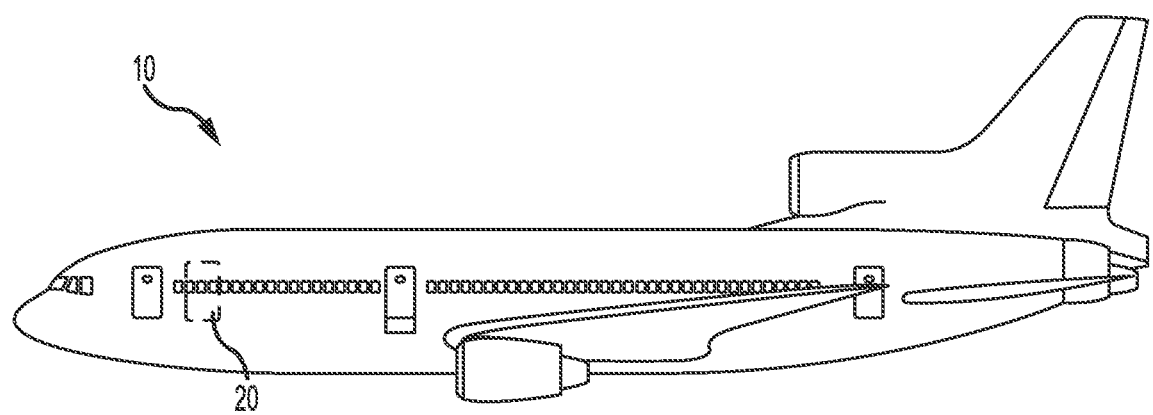
FIG. 1 illustrates an aircraft having a galley, in accordance with various embodiments.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Disclosed herein, according to various embodiments are systems and methods for detecting and predicting scale buildup in a beverage maker. Although details and examples are included herein pertaining to implementing the systems and methods in a beverage maker for an aircraft, the present disclosure is not necessarily so limited, and thus aspects of the disclosed embodiments may be adapted for performance in a variety of other industries. As such, numerous applications of the present disclosure may be realized.

Figure 2:
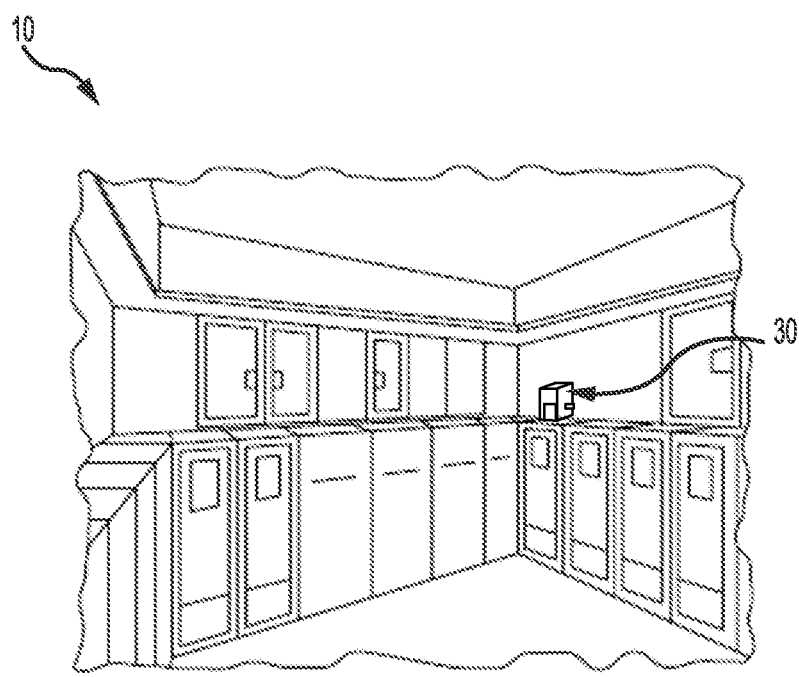
FIG. 2 illustrates a perspective view of a beverage maker in an aircraft galley, in accordance with various embodiments.
Figure 3:
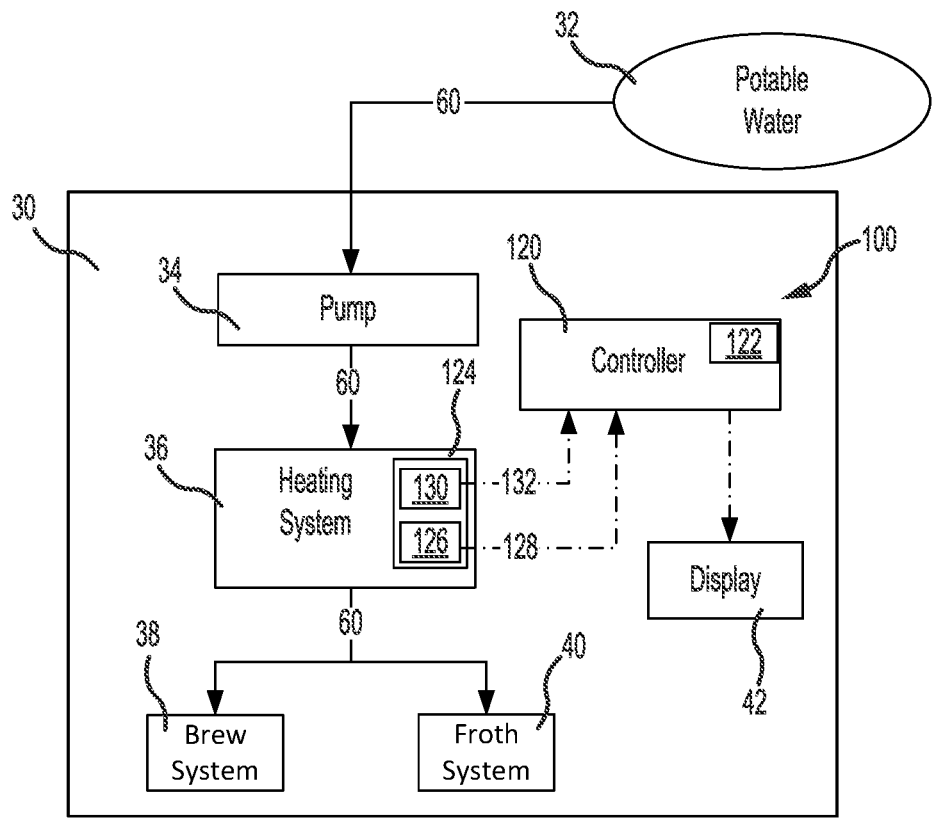
FIG. 3 illustrates a schematic of a beverage maker having a scale detection system, in accordance with various embodiments.

In various embodiments, and with reference to FIGS. 1 and 2, an aircraft 10 may include galley area 20. The galley area 20 may include a beverage maker 30. Beverage maker 30 may include an espresso machine, a cappuccino machine, a coffee machine, a water heater, and/or similar machine, or combinations thereof. FIG. 3 illustrates a schematic of beverage maker 30. Beverage maker 30 receives water 60 from a potable water source 32. Potable water source 32 may be located on aircraft 10 (FIG. 1). Beverage maker 30 may include one or more pump(s) 34. Pump(s) 34 is/are configured to pump water 60 from a potable water source 32 through various components of beverage maker 30. In various embodiments, pump(s) 34 may be located outside beverage maker 30. For example, pump(s) 34 may be coupled between an output of potable water source 32 and a potable water input of beverage maker 30. In various embodiments, pressurization of the potable water system may be performed by means other than pumps, e.g., bleed-off pressure from jet engines.

Beverage maker 30 includes a heating system 36. Heating system 36 is configured to increase a temperature of the water 60 received from potable water source 32 and provided to at least one of a brew system 38 and/or a froth system 40 of beverage maker 30.

Figure 4:
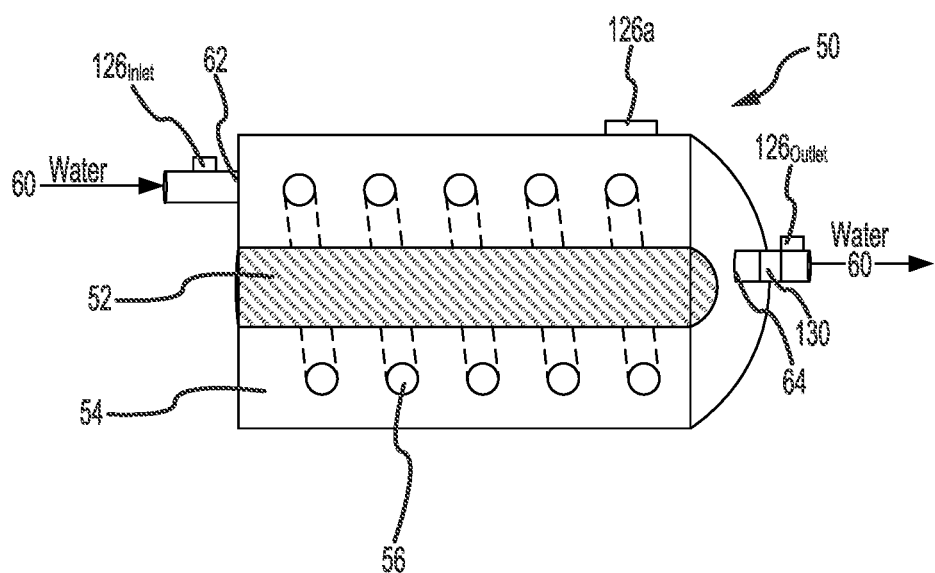
FIG. 4 illustrates an inline heat exchanger, in accordance with various embodiments.

With reference to FIG. 4, a cross-section view of an inline heat exchanger 50 of heating system 36 is illustrated. Inline heat exchanger 50 includes a heating element 52 and a thermally conductive block 54 (also referred to herein as a heating block) located about the heating element 52. In various embodiments, thermally conductive block 54 is formed of a metal or metal alloy. For example, thermally conductive block 54 may be formed of aluminum, copper, stainless steel, or any other suitably conductive material. A conduit 56 is located through thermally conductive block 54. Conduit 56 is thermally coupled to thermally conductive block 54. In various embodiments, conduit 56 is helically formed about heating element 52. While conduit 56 is illustrated as formed through thermally conductive block 54, in various embodiments, conduit 56 may be located about the outer circumferential surface of thermally conductive block 54. In other embodiments, conduit 56 may be a channel defined by thermally conductive block 54 (i.e., water 60 may be in direct contact with thermally conductive block 54).

During operation, potable water 60 from potable water source 32 (FIG. 3) flows into an inlet 62 of thermally conductive block 54. Water 60 flows through conduit 56 and about heating element 52. Thermally conductive block 54 conducts heat generated by heating element 52 into water 60, thereby increasing the temperature of water 60 as it flows through conduit 56. Water 60 exits thermally conductive block 54 at outlet 64. In this regard, thermally conductive block 54 and heating element 52 are configured to heat water 60 as it flows through conduit 56.

Figure 5:
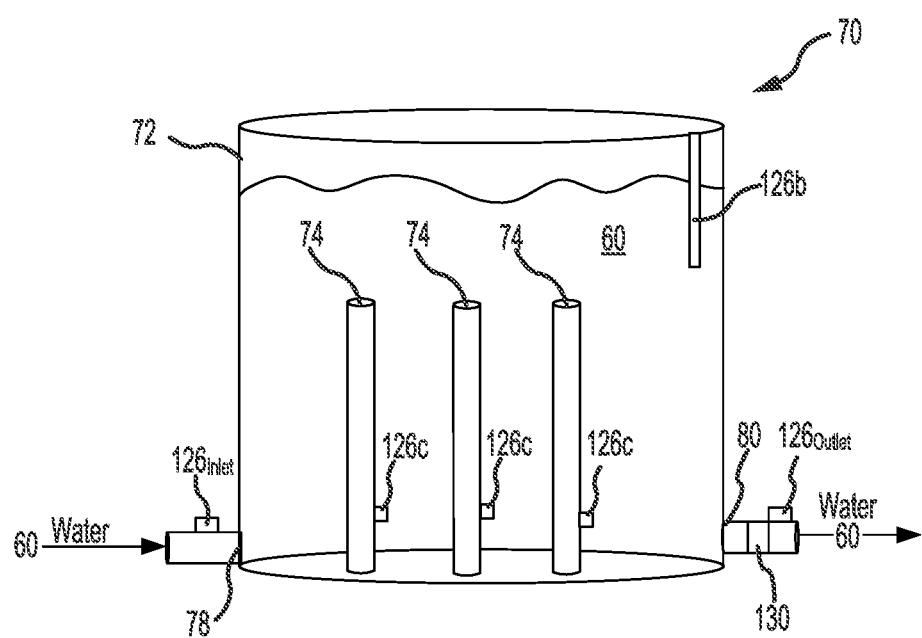
FIG. 5 illustrates a reservoir heating system, in accordance with various embodiments.

While FIG. 4 illustrates an inline heat exchanger 50, it is further contemplated and understood that, in various embodiments, heating system 36 may include a reservoir heater. FIG. 5 illustrates a reservoir heater 70. In various embodiments, beverage maker 30 may include reservoir heater 70 in place of, or in addition to, inline heat exchanger 50 (FIG. 4). Reservoir heater 70 includes a water reservoir 72 and one or more heating element(s) 74 located in water reservoir 72. Heating elements 74 comprise immersion heaters that are in direct contact with the fluid to be heated. For example, heating element 74 may include a resistance heating element (e.g., a nichrome heater core) embedded in a conductive thermal mass (i.e., a thermally conductive electrical insulator) with a metal casing located about the conductive thermal mass. The metal casing is in direct contact with the water 60 in the water reservoir 72.

During operation, potable water 60 from potable water source 32 (FIG. 3) flows into an input 78 of water reservoir 72, heat generated by heating element(s) 74 is conducted into water 60, thereby increasing the temperature of water 60. Water 60 exits water reservoir 72 via an outlet 80. While an inline heat exchanger (FIG. 4) and a reservoir heater have been described, it is contemplated and understood that beverage maker 30 may include other types of fluid heaters. For example, in various embodiments, heating system 36 may comprise a fluid to fluid heat exchanger.

Returning to FIG. 3, in accordance with various embodiments, beverage maker 30 further includes a brew system 38 and/or a froth system 40. Brew system 38 and froth system 40 are each configured to receive heated fluid (e.g., water or steam) output from heating system 36. Brew system 38 may be configured to brew (e.g., mix heated water 60 with) coffee, tea, espresso, etc. Froth system 40 may be configured to combine steam and milk to form froth.

In accordance with various embodiments, beverage maker 30 includes a scale detection and monitoring system 100. As described in further detail below, scale detection and monitoring system 100 is configured to monitor scale buildup in heating system 36. Scale detection and monitoring system 100 determines the scale buildup and efficiency of heating system 36 based on a change in temperature in at least one of the heating block of heating system 36 or of the water 60 output from heating system 36. In various embodiments, scale detection and monitoring system 100 may also use a flow rate of water 60 through conduit 56 and/or an amount of energy input into heating system 36 to determine the scale buildup and heating system efficiency.

In accordance with various embodiments, scale detection and monitoring system 100 includes a controller 120. Controller 120 may include a general-purpose processor, a digital signal processor (DSP), an application specific integrated circuit (ASIC), a field programmable gate array (FPGA), or some other programmable logic device, discrete gate or transistor logic, discrete hardware components, or any combination thereof. A tangible, non-transitory computer-readable storage medium 122 may be in communication with controller 120. The storage medium 122 may comprise any tangible, non-transitory computer-readable storage medium known in the art. The storage medium 122 has instructions stored thereon that, in response to execution by controller 120, cause controller 120 to perform operations related to detecting and monitoring scale buildup in beverage maker 30.

Mineral deposits (i.e., scale) on the walls of conduit 56 (FIG. 4) and/or on the walls of heating element(s) 74 (FIG. 5) can act as an insulator and decrease the efficiency of heat transfer to water 60. Scale buildup on the walls of conduit 56 (FIG. 4) and/or on the walls of the inlet 78 and/or outlet 80 (FIG. 5) can also impede fluid flow, which also tends to decrease heating system efficiency. Controller 120 may be configured to detect and monitor scale buildup based on signals received from a sensor unit 124 of heating system 36.

With combined reference to FIGS. 3, 4, and 5, in accordance with various embodiments, sensor unit 124 includes at least one temperature sensor 126 (e.g., resistive temperature device) configured to send measured temperature signals 128 to controller 120. In various embodiments, sensor unit 124 includes a heating block temperature sensor 126a operably coupled to the heating block 54 in FIG. 4. Heating block temperature sensor 126a is configured to measure a temperature of the heating block 54. In various embodiments, sensor unit 124 includes a liquid temperature sensor 126b located in water reservoir 72 in FIG. 5. Liquid temperature sensor 126b is configured to measure a temperature of the water 60 in water reservoir 72. In various embodiments, sensor unit 124 includes one or more temperature sensors immersion heater temperature sensors 126c operably coupled to heating elements 74 in water reservoir 74.

Heater temperature sensors 126c are configured to measure a temperature of heating elements 74 In various embodiments, sensor unit 124 includes an inlet temperature sensor 126$_{Inlet}$ configured to measure temperature of the water 60 at the inlet 62, 78 of the heating system 36 and an outlet temperature sensor 126$_{Outlet}$ configured to measure a temperature of the water 60 at the outlet 68, 80 of the heating system 36.

In various embodiments, sensor unit 124 may also include one or more flow sensor(s) 130, configured to send measured flow rate signals 132 to controller 120. The flow sensor(s) 130 may be configured to measure at a flow rate (e.g. volume of fluid per unit of time) of the water 60 through conduit 56 and/or output from water reservoir 72 (e.g., the flow rate of water 60 through heating system 36).

Figure 6:
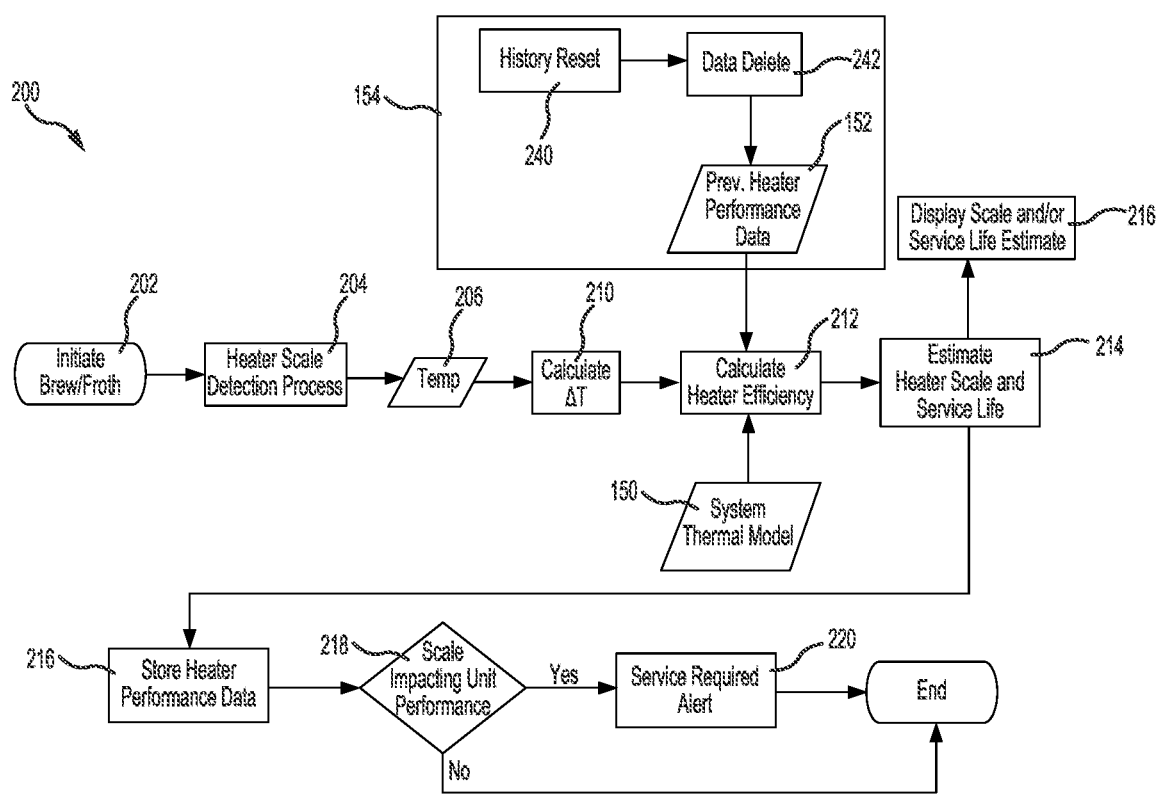
FIG. 6 illustrates a flow diagram for a method of scale detection in a beverage maker, in accordance with various embodiments.

With additional reference to FIG. 6, a method 200 for detecting and monitoring scale buildup in a beverage maker is illustrated. The steps of method 200 may be performed by controller 120, with momentary reference to FIG. 3, to detect and monitor scale buildup in beverage maker 30. Method 200 may begin in response to at least one of a brew operation or a froth operation being initiated (step 202). Stated differently, step 202 may comprise controller 120 receiving a signal indicating that a brew operation or a froth operation has been initiated. Initiating a brew operation or a froth operation may cause water 60 from potable water source 32 to flow into heating system 36.

In accordance with various embodiments, controller 120 may start a scale detection process in response to determining the brew operation or the froth operation has been initiated (step 204). In response to starting the scale detection process, controller 120 may begin receiving measured temperature signals 128 from temperature sensor(s) 126 (step 206). Controller 120 calculates a change in temperature ($\Delta T$) using the measured temperature signals 128 (step 210). For example, controller 120 may calculate $\Delta T$ based on measured temperature signals 128 from heating block temperature sensor 126a and/or based on measured temperature signals 128 from liquid temperature sensor 126b and/or based on measured temperature signals 128 received from inlet temperature sensor 126$_{Inlet}$ and outlet temperature sensor 126$_{Outlet}$. In various embodiments, step 210 may comprise controller 120 calculating a rate of $\Delta T$ (e.g., the change in temperature relative a duration of time). In various embodiments, step 210 may comprise controller 120 calculating a duration of time to reach a threshold $\Delta T$. For example, controller 120 may calculate the duration of time it takes for the temperature of the heating block to decrease by, for example, 25° Celsius (C), or 50° C., or any other desired $\Delta T$. In various embodiments, controller 120 may calculate the duration of time it takes for the outlet water temperature to be 25° C., 50° C., or any other desired $\Delta T$ greater than the inlet water temperature.

Controller 120 may then calculate an efficiency of heating system 36 based on $\Delta T$ (step 212). Step 212 may comprise controller 120 determining an expected $\Delta T$ and calculating a difference between the expected $\Delta T$ and the $\Delta T$ calculated in step 210 (referred to herein as "actual $\Delta T$"). In other words, actual $\Delta T$ is calculated based on measured temperature signals 128 and then actual $\Delta T$ is compared to expected $\Delta T$. In various embodiments, controller 120 may calculate the efficiency as a percentage of expected $\Delta T$. In this regard, controller 120 may calculate the efficiency by dividing actual $\Delta T$ by expected $\Delta T$ (actual $\Delta T$/expected $\Delta T$). Controller 120 may determine an expected $\Delta T$ using a system thermal model 150, which may be stored in storage medium 122 (or any other memory accessible to controller 120). System thermal model 150 is modelled to the specifications of heating system 36. In this regard, system thermal model 150 may model expected $\Delta T$ based on the specifications of the heating unit of heating system 36 (e.g., the material, volume, and/or thermal conductivity of the heating block, the diameter of the conduit, the specification of heating elements 52, 76, etc.) and the energy supplied to heating system 36 (e.g., the energy supplied to heating elements 52, 76).

In various embodiments, step 212 may further comprise controller 120 comparing $\Delta T$ to previous heating system performance data 152, stored in a heating system performance database 154. Heating system performance database 154 may be located in storage medium 122 (or any other memory accessible to controller 120). For example, previous heating system performance data 152 includes $\Delta T$s and/or heating system efficiencies (e.g., actual $\Delta T$/expected $\Delta T$) calculated during previous heating system scale detection processes performed by controller 120. Controller 120 may compare the current $\Delta T$ to the $\Delta T$s calculated during previous heating system scale detection processes and/or controller 120 may compare a current ratio of actual $\Delta T$ to expected $\Delta T$ to ratios of actual $\Delta T$ to expected $\Delta T$ calculated during previous heating system scale detection processes. In this regard, step 212 may include controller 120 determining a trend in the efficiency of heating system 36.

Controller 120 may estimate a scale buildup within heating system 36 (step 214). Controller 120 may estimate the scale buildup based on the heating system efficiency calculated in step 212. For example, a decrease in efficiency correlates to an increase in scale buildup. Step 214 may further include controller 120 estimating a remaining service life of heating system 36 based on the trend in the efficiency and/or based on a rate at which scale buildup is increasing. For example, controller 120 may estimate a number of brewing operations and/or frothing operations that can be performed and/or a duration of time (minutes, hours, etc.) heating system 36 may be operated before significantly impacting performance of beverage maker 30. For example, controller 120 may estimate a number of brewing operations and/or frothing operations that can be performed before the efficiency (determined in step 212) will be less than a threshold efficiency (e.g., 75% efficiency, 50% efficiency, etc.).

In accordance with various embodiments, controller 120 may command a display device 42 of beverage maker 30 to display at least one of the estimated scale buildup or the estimated remaining service life. For example, the estimated scale buildup may be displayed as percentage of a maximum allowable scale buildup. The maximum allowable scale buildup may correlate to a scale buildup that would result in the efficiency of heating system 36 being less than the threshold efficiency. For example, controller 120 may command display device 42 to display that the scale buildup is at 75% and/or that 50 more brewing operations remain, and/or that 25 more frothing operation remain, and/or that heating system has 1500 hours remaining. It is understood that the previous values are for purposes of example only, and that display device 42 may display any message, symbol, picture, text, etc. configured to convey the estimated scale buildup and/or the estimated remaining service life). Displaying the current scale buildup or remaining service life allows the aircraft operator to better plan for and schedule maintenance (e.g., a descaling) of beverage maker 30. Allowing the aircraft operator to schedule maintenance and/or scale removal decreases a probability that beverage maker 30 will be unavailable during flight.

In accordance with various embodiments, controller 120 stores the heating system performance data (e.g., the heating system efficiency calculated in step 212, the scale buildup estimated in step 214, and/or the service life estimated in step 214) for use in subsequent scale detection processes (step 216). The heating system performance data may be stored in heating system performance database 154.

In accordance with various embodiments, controller 120 determines whether the scale buildup estimated in step 214 is impacting a performance of beverage maker 30 (step 218). Controller 120 may determine the scale buildup is impacting the performance of beverage maker 30 if the efficiency (determined in step 212) is less than a threshold efficiency (e.g., less than 75% efficient, less than 50% efficient, etc.). If controller 120 determines the scale buildup is impacting the performance of beverage maker 30, controller 120 commands display device 42 to output a maintenance needed alert (step 220). The maintenance needed alert may convey to an operator that beverage maker 30 needs to be descaled and that beverage maker 30 should be scheduled for service.

In accordance with various embodiments, controller 120 may be configured to perform a history reset (step 240) and delete previous heating system performance data 152 from heating system performance database 154 (step 242). Controller 120 may perform the history reset in response to a descaling operation being performed. Controller 120 may perform the history reset and data deletion (steps 240, 242) in response to receiving a reset signal. The reset signal may be sent manually. For example, the reset signal may be sent in response to maintenance personnel pressing a button, or other input on beverage maker 30, after performing the descaling operation. In various embodiment, controller 120 may perform the history reset and data deletion (steps 240, 242) in response to determining the estimated scale buildup (determined in step 214) is sufficiently less than the estimated scale buildup from the previous (or last) heating system scale detection process. In this regard, the current heating system scale detection process may be referred to as "n," the last heating system scale detection process being "n−1," the second to last heating system scale detection process being "n−2," and so on. Controller 120 may perform the history reset and data deletion (steps 240, 242) if the difference between estimated scale buildup from the last heating system scale detection process $((n-1)_{Estimated\_Scale\_Buildup})$ and the estimated scale buildup from the current heating system scale detection process $(n_{Estimated\_Scale\_Buildup})$ is greater than a threshold difference (i.e., is $n_{Estimated\_Scale\_Buildup} - (n-1)_{Estimated\_Scale\_Buildup} >$ threshold difference).

Figure 7:
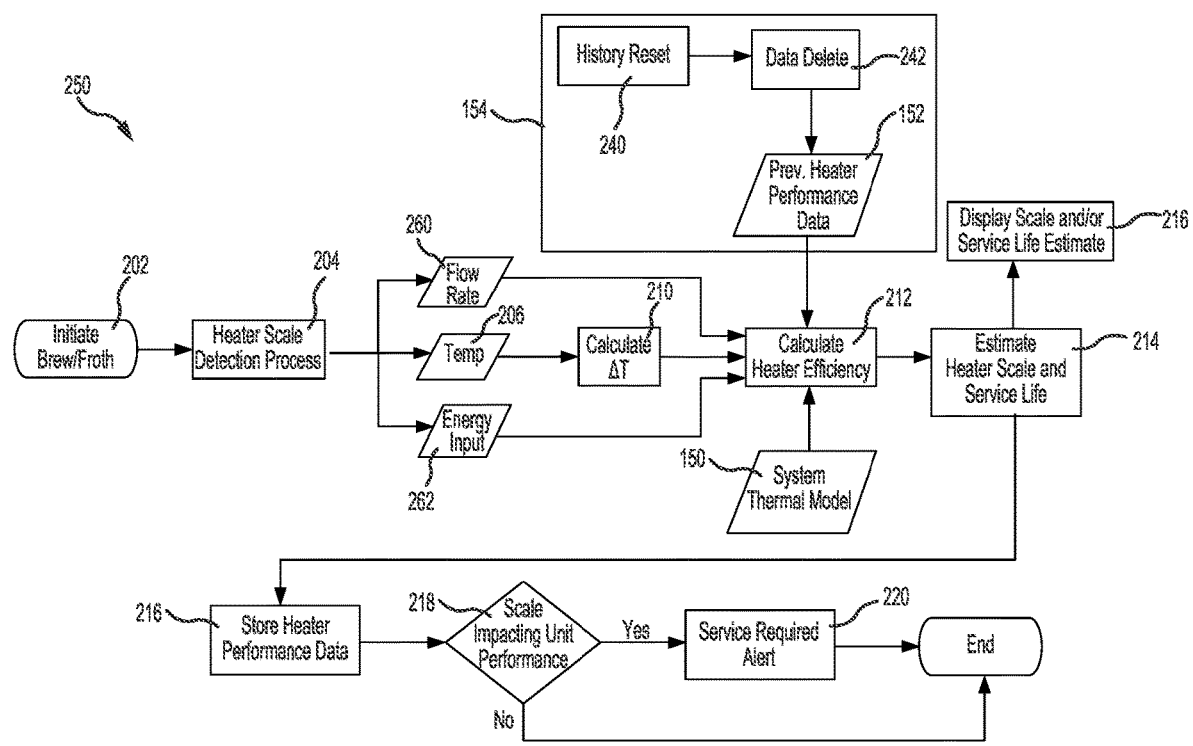
FIG. 7 illustrates a flow diagram for a method of scale detection in a beverage maker, in accordance with various embodiments.

With reference to FIG. 7, a method 250 for detecting and monitoring scale buildup is illustrated. The steps of method 200 may be performed by controller 120 to detect and monitor scale buildup in beverage maker 30. Method 250 may include steps similar to method 200 in FIG. 6. In this regard, elements with like element numbering, as depicted in FIG. 6, are intended to be the same and will not necessarily be repeated for the sake of brevity.

In accordance with various embodiments, controller 120 may also receive measured flow rate signals 132 from flow rate sensor(s) 130 (step 260). In various embodiments, controller 120 may also receive energy input data (step 262). Energy input data may comprise a duration of time the heating system is powered on, a current and/or voltage provided to heating system 36 (e.g., current and/or voltage supplied to heating elements 52, 76), or similar energy data related to operating of heating system 36. Controller 120 may calculate the heating system efficiency (step 212) using the calculated/actual ΔT (step 210) along with the measured flow rate signals 132 and/or the energy input data. Using the flow rate data along with the energy input data may increase the accuracy of the heating system efficiency calculation and/or the estimated scale buildup and remaining service life calculations.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods, and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A beverage maker, comprising:
   a heating system;
   a temperature sensor operably coupled to the heating system;
   a controller configured to receive measured temperature signals from the temperature sensor; and
   a tangible, non-transitory computer-readable storage medium having instructions stored thereon for that, in response to execution by the controller, cause the controller to perform operations comprising:
      receiving, by the controller, a series of measured temperature signals from the temperature sensor;
      calculating, by the controller, a change in temperature using the series of measured temperature signals;
      determining, by the controller, an expected change in temperature using a system thermal model;
      comparing, by the controller, the change in temperature to the expected change in temperature;
      accessing, by the controller, previous heating system performance data stored in the heating system performance database;
      comparing, by the controller, the change in temperature to the previous heating system performance data stored;
      calculating, by the controller, an efficiency of the heating system based on the change in temperature;
      estimating, by the controller, a scale buildup based on the efficiency of the heating system; and
      storing, by the controller, at least one of the estimated scale buildup or the efficiency of the heating system in a heating system performance database.

2. The beverage maker of claim 1, further comprising a display device operably coupled to the controller, wherein the operations further comprise commanding, by the controller, the display device to display the estimated scale buildup.

3. The beverage maker of claim 1, further comprising a display device operably coupled to the controller, wherein the operations further comprise:
   determining, by the controller, an estimated service life of the heating system; and
   commanding, by the controller, the display device to display the estimated service life.

4. The beverage maker of claim 1, further comprising a display device operably coupled to the controller, wherein the operations further comprise:
   determining, by the controller, if the estimated scale buildup is impacting a performance of the beverage maker; and
   commanding, by the controller, the display device to display a maintenance required alert, if the estimated scale buildup is impacting the performance of the beverage maker.

5. The beverage maker of claim 4, wherein determining, by the controller, if the estimated scale buildup is impacting the performance of the beverage maker comprises comparing, by the controller, the efficiency of the heating system to a threshold efficiency.

6. The beverage maker of claim 1, further comprising a flow rate sensor operably coupled to the heating system, the flow rate sensor being configured to measure a rate of flow of fluid through the heating system, wherein the controller is configured to receive a flow rate measurement signal from the flow rate sensor and calculate the efficiency of the heating system using the flow rate measurement signal.

7. The beverage maker of claim 1, wherein the controller is configured to receive energy input data, and wherein the controller calculates the efficiency of the heating system using the energy input data.

8. An article of manufacture including a tangible, non-transitory computer-readable storage medium having instructions stored thereon for detecting and monitoring scale buildup in a beverage maker and that, in response to execution by a controller, cause the controller to perform operations comprising:
   receiving, by the controller, a series of measured temperature signals from a temperature sensor operably coupled to a heating system of the beverage maker;
   determining, by the controller, a change in temperature using the series of measured temperature signals;
   accessing, by the controller, previous heating system performance data stored in the heating system performance database;
   comparing, by the controller, the change in temperature to the previous heating system performance data stored;
   calculating, by the controller, an efficiency of the heating system based on the change in temperature;
   estimating, by the controller, a scale buildup based on the efficiency of the heating system; and
   storing, by the controller, at least one of the estimated scale buildup or the efficiency of the heating system in a heating system performance database.

9. The article of claim 8, wherein calculating, by the controller, the efficiency of the heating system based on the change in temperature comprises:
   determining, by the controller, an expected change in temperature using a system thermal model; and
   comparing, by the controller, the change in temperature to the expected change in temperature.

10. The article of claim 9, wherein the operations further comprise commanding, by the controller, a display device to display the estimated scale buildup.

11. The article of claim 9, wherein the operations further comprise:
    determining, by the controller, an estimated service life of the heating system; and
    commanding, by the controller, a display device to display the estimated service life.

12. The article of claim 11, wherein the operations further comprise commanding, by the controller, the display device to display a maintenance required alert if the efficiency of the heating system is less than a threshold efficiency.

13. The article of claim 8, wherein the operations further comprise:
    determining, by the controller, a descaling operation has been performed; and
    deleting, by the controller, the previous heating system performance data from the heating system performance database.

14. A method for detecting and monitoring scale buildup in a beverage maker, comprising:
    receiving, by a controller, a series of measured temperature signals from a temperature sensor operably coupled to a heating system of the beverage maker;
    determining, by the controller, a change in temperature using the series of measured temperature signals;
    accessing, by the controller, previous heating system performance data stored in the heating system performance database;
    determining, by the controller, an expected change in temperature using a system thermal model;
    comparing, by the controller, the change in temperature to the expected change in temperature;
    calculating, by the controller, an efficiency of the heating system based on the change in temperature;
    estimating, by the controller, a scale buildup based on the efficiency of the heating system; and
    storing, by the controller, at least one of the estimated scale buildup or the efficiency of the heating system in a heating system performance database.

15. The method of claim 14, further comprising:
    determining, by the controller, a descaling operation has been performed; and
    deleting, by the controller, the previous heating system performance data from the heating system performance database.

16. The method of claim 14, further comprising:
    receiving, by the controller, a flow rate measurement signal from a flow rate sensor configured to measure a flow rate of a heat exchanger fluid through the heating system;
    receiving, by the controller, energy input data; and
    determining, by the controller, the change in temperature using the series of measured temperature signals, the flow rate measurement signal, and the energy input data.

17. A scale detection and monitoring system, comprising:
    a heating system further comprising:
        an inline heat exchanger, the inline heat exchanger including:
            a heating element;
            a thermally conductive heating block located about the heating element; and
            a conduit thermally coupled to the heating element via the thermally conductive heating block, wherein the temperature sensor is configured to measure a temperature of the thermally conductive heating block;
    a temperature sensor operably coupled to the heating system; and
    a controller in communication with the temperature sensor, wherein the controller is configured to receive a series of measured temperature signals from the temperature sensor and determine a change in temperature using the series of measured temperature signals, and wherein the controller is configured to calculate an efficiency of the heating system based on the change in temperature and estimate a scale buildup based on the efficiency of the heating system.

18. The scale detection and monitoring system of claim 17, further comprising a flow rate sensor configured to measure a rate of fluid flow through the heating system, wherein the controller is configured to receive a measured flow rate signal from the flow rate sensor.

19. The scale detection and monitoring system of claim 18, wherein the controller is configured to calculate the efficiency of the heating system based on the change in temperature and the measured flow rate signal.

* * * * *